A. Millochan.

Rotary-Engine.

No 3131 Reissued Sept 22, 1868.

Witnesses
Samuel W. Sewell
Chas. H. Smith

A. Millochan

United States Patent Office.

METROPOLITAN ROTARY-ENGINE COMPANY, OF NEW YORK, N. Y., ASSIGNEES, BY MESNE ASSIGNMENTS, OF ADOLPH MILLOCHAU, OF SAME PLACE.

*Letters Patent No.* 40,571, *dated November* 10, 1863; *reissue No.* 3,131, *dated September* 22, 1868.

IMPROVEMENT IN ROTARY STEAM-ENGINES.

The Schedule referred to in these Letters Patent and making part of the same.

TO ALL WHOM IT MAY CONCERN:

Be it known that the following, in connection with the accompanying drawing, forming part of this specification, is a full, clear, and exact description of an Improvement in Rotary Engines, by ADOLPH MILLOCHAU, of the city, county, and State of New York.

Figure 1:
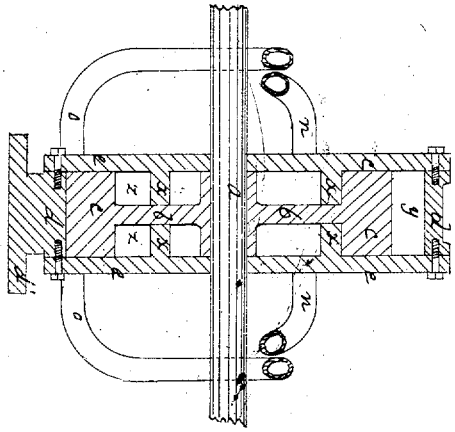
Figure 2:
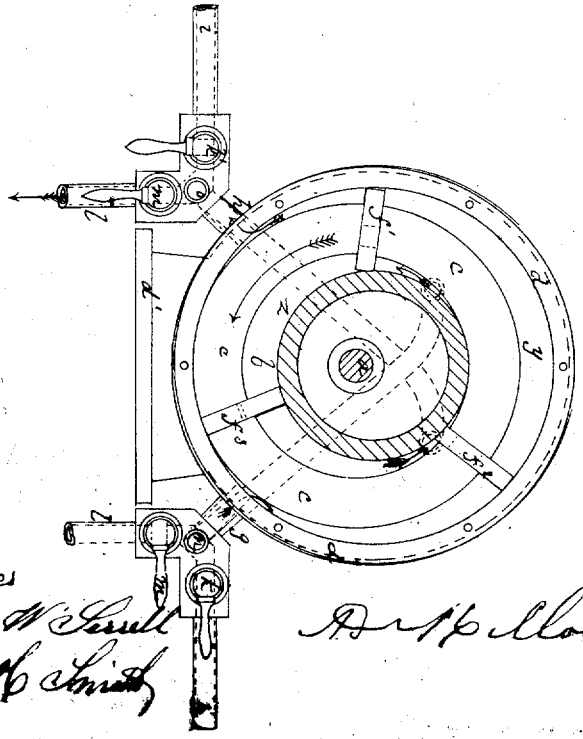

Figure 1 is a cross-section of an engine, constructed according to this improvement, at a vertical plane lengthwise of the shaft, and Figure 2 is a side elevation thereof, with one of the heads removed, and the projecting ring of the head in section.

Similar marks of reference denote the same parts.

The nature of the invention consists in a combination, for changing the course of the engine as required, of induction and eduction-pipes, and cocks or valves, with a wheel, ring, or rim, carrying radial pistons, for operation in inner and outer steam-spaces or chambers, as hereinafter set forth.

In the drawing, *a* is a shaft, receiving a wheel, *b*, with a rim, *c*, of a quadrangular section, the periphery of which is in contact at one point with the case *d*, that is circular, but eccentric to the shaft *a*, hence a crescent-shaped space, *y*, will be left between *c* and *d*; and *e e* are the heads of the engine, setting tightly against the sides of the rim *c*; and *x x* are circular flanges on the inner faces of *e e*, concentric with the case *d*, forming, as it were, an inner stationary cylinder, and setting up tightly to the wheel *b*, and in contact with the inner periphery of the rim *c*, at a point opposite to that at which the outer periphery of said rim *c* touches the case *d*.

Figure 3:
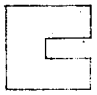

Slots or mortises are provided through the rim *c*, receiving the pistons $f^1$, $f^2$, and $f^3$, that are themselves slotted, as seen in fig. 3, to pass on each side of *b*.

*g* and *h* are the ports or steam-ways to the space *y* of the engine; *i i* are the steam-pipes, with cocks or valves, *k k'*; and *m m'* are the exhaust-valves to the pipes *l l*. *n* and *o* are pipes that proceed from near the pipes *g* and *h*, and, crossing each other, enter through *e*, and supply steam to or receive the exhaust from the inner crescent-shaped chambers *z z*.

If the valves or cocks *k* and *m'* are open, as seen at fig. 2, and the cocks or valves *k'* and *m* closed, the steam will travel in the direction indicated by the arrows, and enter through *g*, and exhaust through *h*, and act in the space *y* against the pistons, and rotate them, and the rim or wheel and shaft *a*, as indicated by the arrow on *c*. At the same time, the steam, entering the spaces *z z*, on the respective sides of *b*, through the pipes *n*, acts on the inner portions of the pistons in the spaces *z z*, rendering the power exerted on *b* and *a* as uniform as possible in the opposite sides of *a*, or peripheries of the wheel or ring carried by it, and preventing the strain, friction, and wear being all on one side of the said shaft *a*. The distance between the case *d* and flanges *x* being the same all around, the pistons are retained by them, while the rim *c* travels eccentrically.

Stuffing-boxes may be applied at the heads *e*, around *a*, and any suitable packings provided the pistons.

It will be evident that by opening the valves or cocks *m* and *k'*, and closing *k* and *m'*, the engine will rotate in the opposite direction. Said engine, instead of being a driver, may be driven by any suitable power, to work as a pump for pumping water or other fluids.

What is here claimed, and desired to be secured by Letters Patent, is—

The pipes *i*, *l*, *n*, and *o*, and valves or cocks *k*, *k'*, *m*, and *m'*, in combination with the ring *c*, and pistons acting in the steam-spaces *y* and *z*, substantially as specified.

M. MARSHALL,
*President Metropolitan Rotary-Engine Company.*

L. H. MOORE,
*Secretary Metropolitan Rotary-Engine Company.*

Witnesses:
A. LE CLERC,
J. BERENAN.